United States Patent
Gross et al.

(10) Patent No.: US 11,295,012 B2
(45) Date of Patent: Apr. 5, 2022

(54) CHARACTERIZING AND MITIGATING SPILLOVER FALSE ALARMS IN INFERENTIAL MODELS FOR MACHINE-LEARNING PROGNOSTICS

(71) Applicant: Oracle International Corporation, Redwood Shores, CA (US)

(72) Inventors: Kenny C. Gross, Escondido, CA (US); Ashin George, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 758 days.

(21) Appl. No.: 16/244,006

(22) Filed: Jan. 9, 2019

(65) Prior Publication Data

US 2020/0218801 A1    Jul. 9, 2020

(51) Int. Cl.
*G06F 21/55* (2013.01)
*G06N 7/00* (2006.01)
*G06N 20/00* (2019.01)
*G08B 29/18* (2006.01)

(52) U.S. Cl.
CPC .......... *G06F 21/552* (2013.01); *G06N 7/005* (2013.01); *G06N 20/00* (2019.01); *G08B 29/185* (2013.01); *G06F 2221/034* (2013.01)

(58) Field of Classification Search
CPC .. G06F 21/552; G06F 2221/034; G06F 17/18; G06N 20/00; G06N 7/005; G08B 29/185; G05B 23/0205; G05B 23/0218; G05B 23/024; G05B 23/0243; G05B 23/0254; G05B 23/0259; G05B 23/0283
See application file for complete search history.

(56) References Cited

U.S. PATENT DOCUMENTS

| | | | | | |
|---|---|---|---|---|---|
| 5,745,382 | A | * | 4/1998 | Vilim | G06K 9/00536 706/15 |
| 5,764,509 | A | * | 6/1998 | Gross | G05B 23/0254 706/45 |
| 6,892,163 | B1 | * | 5/2005 | Herzog | G05B 23/0254 702/181 |
| 7,082,379 | B1 | * | 7/2006 | Bickford | G06K 9/6278 700/30 |
| 7,158,917 | B1 | * | 1/2007 | Bickford | G05B 23/0254 702/181 |
| 7,415,382 | B1 | * | 8/2008 | Bickford | G06K 9/6278 702/181 |

(Continued)

*Primary Examiner* — Orlando Bousono
(74) *Attorney, Agent, or Firm* — Park, Vaughan, Fleming & Dowler LLP

(57) ABSTRACT

The disclosed embodiments relate to a system that determines whether an inferential model is susceptible to spillover false alarms. During operation, the system receives a set of time-series signals from sensors in a monitored system. The system then trains the inferential model using the set of time-series signals. Next, the system tests the inferential model for susceptibility to spillover false alarms by performing the following operations for one signal at a time in the set of time-series signals. First, the system adds degradation to the signal to produce a degraded signal. The system then uses the inferential model to perform prognostic-surveillance operations on the time-series signals with the degraded signal. Finally, the system detects spillover false alarms based on results of the prognostic-surveillance operations.

20 Claims, 11 Drawing Sheets

(56) References Cited

U.S. PATENT DOCUMENTS

| | | | | |
|---|---|---|---|---|
| 8,706,451 B1* | 4/2014 | Gross | ............ | G06F 11/0706 |
| | | | | 703/2 |
| 2003/0014692 A1* | 1/2003 | James | ............ | G05B 23/0254 |
| | | | | 714/E11.158 |
| 2003/0018928 A1* | 1/2003 | James | ............ | G06F 11/2263 |
| | | | | 714/E11.158 |
| 2004/0002776 A1* | 1/2004 | Bickford | ............ | G05B 23/0254 |
| | | | | 700/52 |
| 2020/0067969 A1* | 2/2020 | Abbaszadeh | ............ | G06K 9/6269 |

* cited by examiner

| Sig# | TF(before) | TF(after) | Ratio |
|---|---|---|---|
| 1 | 0.012 | 0.082 | 6.83333 |
| 2 | 0.002 | 0.002 | 1 |
| 3 | 0.004 | 0.008 | 2 |
| 4 | 0.012 | 0.098 | 8.16667 |
| 5 | 0.006 | 0.498 | 83 |
| 6 | 0.002 | 0.032 | 16 |
| 7 | 0.004 | 0.014 | 3.5 |
| 8 | 0.002 | 0.002 | 1 |
| 9 | 0.002 | 0.01 | 5 |
| 10 | 0.002 | 0.04 | 20 |

FIG. 6

CHARACTERIZING AND MITIGATING SPILLOVER FALSE ALARMS IN INFERENTIAL MODELS FOR MACHINE-LEARNING PROGNOSTICS

BACKGROUND

Field

The disclosed embodiments generally relate to techniques for performing prognostic-surveillance operations based on time-series sensor signals. More specifically, the disclosed embodiments relate to a technique for characterizing and mitigating the effects of spillover false alarms in inferential models that support machine-learning-based prognostic-surveillance systems.

Related Art

Large numbers of sensors are presently deployed to monitor the operational health of critical assets in many different types of business-critical systems. For example, a medium-sized computer data center can include over 1,000,000 sensors monitoring thousands of servers, a modern passenger jet can include 75,000 sensors, and an oil refinery can include over 1,000,000 sensors. These sensors produce large volumes of time-series sensor signals, which can be used to perform prognostic-surveillance operations to facilitate detecting incipient anomalies. This makes it possible to take remedial action before the incipient anomalies develop into failures in the critical assets.

Machine-learning (ML) techniques are beginning to take on a vital role in prognostic surveillance of time-series sensor signals, and also for validating the integrity of the sensors themselves. ML-based prognostic-surveillance systems typically operate by training an inferential model to learn correlations between time-series signals. The trained inferential model is then used to predict values for the time-series signals based on the correlations with other signals, wherein deviations between actual and predicted values for the time-series signals trigger alarms, which indicate an incipient anomaly.

However, ML models often exhibit unexpected dependencies among their input and output signals, which can cause signals that contain no anomalies to trigger false alarms. These "spillover false alarms" can be costly, because they can result in unnecessary maintenance operations to fix components that are not broken. Also, for prognostics-surveillance systems that provide human-in-the-loop supervisory control, the human can take improper actions under ambiguous scenarios where false alarms are being generated for multiple signals due to spillover. Moreover, if components and sensors are replaced in response to spillover false alarms, and the asset is placed back into operation using the same ML prognostics, the asset will continue to generate spillover false alarms from the newly replaced components and sensors. Note that the spillover phenomenon has nothing to do with the quality of the monitored components or the accuracy of the sensors monitoring those components. In fact, it has been demonstrated that higher-accuracy sensors feeding an ML model that is susceptible to spillover will issue more spillover false alarms than lower-accuracy sensors.

Hence, what is needed is a technique for effectively characterizing and mitigating the effects of spillover false alarms for inferential models in prognostic-surveillance systems.

SUMMARY

The disclosed embodiments relate to a system that determines whether an inferential model is susceptible to spillover false alarms. During operation, the system receives a set of time-series signals from sensors in a monitored system. The system then trains the inferential model using the set of time-series signals. Next, the system tests the inferential model for susceptibility to spillover false alarms by performing the following operations for one signal at a time in the set of time-series signals. First, the system adds degradation to the signal to produce a degraded signal. The system then uses the inferential model to perform prognostic-surveillance operations on the time-series signals with the degraded signal. Finally, the system detects spillover false alarms based on results of the prognostic-surveillance operations.

In some embodiments, while detecting the spillover false alarms, the system performs the following operations. For each time-series signal in the set of time-series signals, the system computes moving-window sequential probability ratio test (SPRT) tripping frequencies, and then computes a ratio of a tripping frequency for a most-recent window to a tripping frequency for a window measured prior to adding the degradation to the signal. Next, the system detects spillover false alarms based on increased tripping frequency ratios for non-degraded time-series signals, which are caused by a degraded signal.

In some embodiments, adding the degradation to the signal involves adding different degradation amplitudes to the signal to determine how different degradation amplitudes affect spillover false alarms.

In some embodiments, the training and testing operations are repeated using different numbers of training vectors for the inferential model to determine how different numbers of training vectors affect spillover false alarms.

In some embodiments, the system also adds different amounts of noise to the set of time-series signals while repeating the training and testing operations to determine how different amounts of noise affect spillover false alarms.

In some embodiments, the system also uses different numbers of time-series signals from the set of time-series signals while repeating the training and testing operations to determine how using different numbers of time-series signals affects spillover false alarms. In a variation on these embodiments, using a different number of time-series signals involves throwing out a subset of signals with weak cross-signal correlations from the set of time-series signals.

In some embodiments, when the testing indicates that the inferential model is susceptible to causing spillover false alarms, the system checks the inferential model for spillover. During this checking process, the system uses the inferential model to perform prognostic-surveillance operations on the time-series signals. Then, based on results of the prognostic-surveillance operations, for each time-series signal in the set of time-series signals, the system computes moving-window SPRT tripping frequencies, and computes a ratio of a tripping frequency for a most-recent window to a tripping frequency for a preceding window gathered when the inferential model was initially created. The system then attempts to detect spillover based on increased tripping frequency ratios for the time-series signals. If spillover is detected, the system: removes a causal signal from the set of time-series signals to produce a reduced set of time-series signals; retrains the inferential model based on the reduced set of time-series signals; and rechecks the inferential model for spillover. On the other hand, if no spillover is detected, the system uses the inferential model to perform prognostic-surveillance operations on subsequently received time-series signals from the monitored system.

In some embodiments, while removing the causal signal from the set of time-series signals, the system updates a fault log or generates a notification about the causal signal.

In some embodiments, while using the prognostic inferential model to detect incipient anomalies, the system uses the prognostic inferential model to generate estimated values for the synchronized currently-generated time-series sensor data. Next, the system performs a pairwise differencing operation between actual values and the estimated values for the synchronized currently-generated time-series sensor data to produce residuals. Finally, the system performs an SPRT on the residuals to detect the incipient anomalies.

In some embodiments, detecting the incipient anomalies comprises detecting: an impending failure of the monitored system, or a malicious-intrusion event in the monitored system.

BRIEF DESCRIPTION OF THE FIGURES

FIG. 6 presents a table illustrating tripping frequencies and associated tripping frequency ratios for signals 1-10 before and after degradation of signal 5 in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

Figure 1:
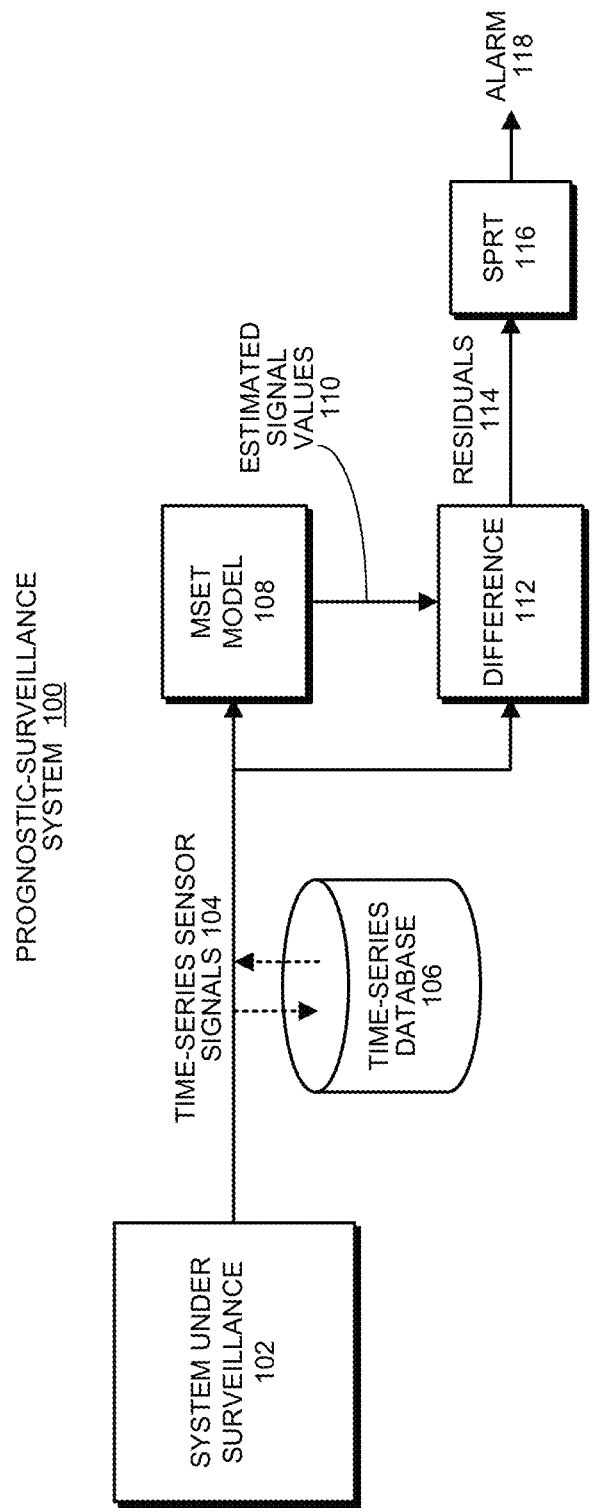
FIG. 1 illustrates an exemplary prognostic-surveillance system in accordance with the disclosed embodiments.

Before describing the spillover detection and mitigation techniques, we first describe a prognostic-surveillance system. FIG. 1 illustrates an exemplary prognostic-surveillance system 100 that accesses a time-series database 106, containing time-series signals in accordance with the disclosed embodiments. As illustrated in FIG. 1, prognostic-surveillance system 100 operates on a set of time-series sensor signals 104 obtained from sensors in a system under surveillance 102. Note that system under surveillance 102 can generally include any type of machinery or facility, which includes sensors and generates time-series signals. Moreover, time-series signals 104 can originate from any type of sensor, which can be located in a component in system under surveillance 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from system under surveillance 102 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics*. 16 (2): 117-186.) In this way, prognostic-surveillance system 100 can proactively alert system operators of incipient anomalies, such as impending failures, hopefully with enough lead time so that such problems can be avoided or proactively fixed.

Spillover

During our spillover analysis, we used a high-fidelity signal synthesizer to generate the realistic sensor signals to facilitate investigating the parameters that give rise to spillover. Note that by using this high-fidelity synthesizer, we know the "ground truth" because when we generate signals that do not have degradation or anomalies, we know the signals are "fault free." In contrast, if we used real sensor signals obtained from a critical asset, and there are no known faults in the asset, then if false alarms are generated on any signals, it will leave open the issue of whether those alarms arose from spillover, or from an unknown developing fault.

Figure 2:
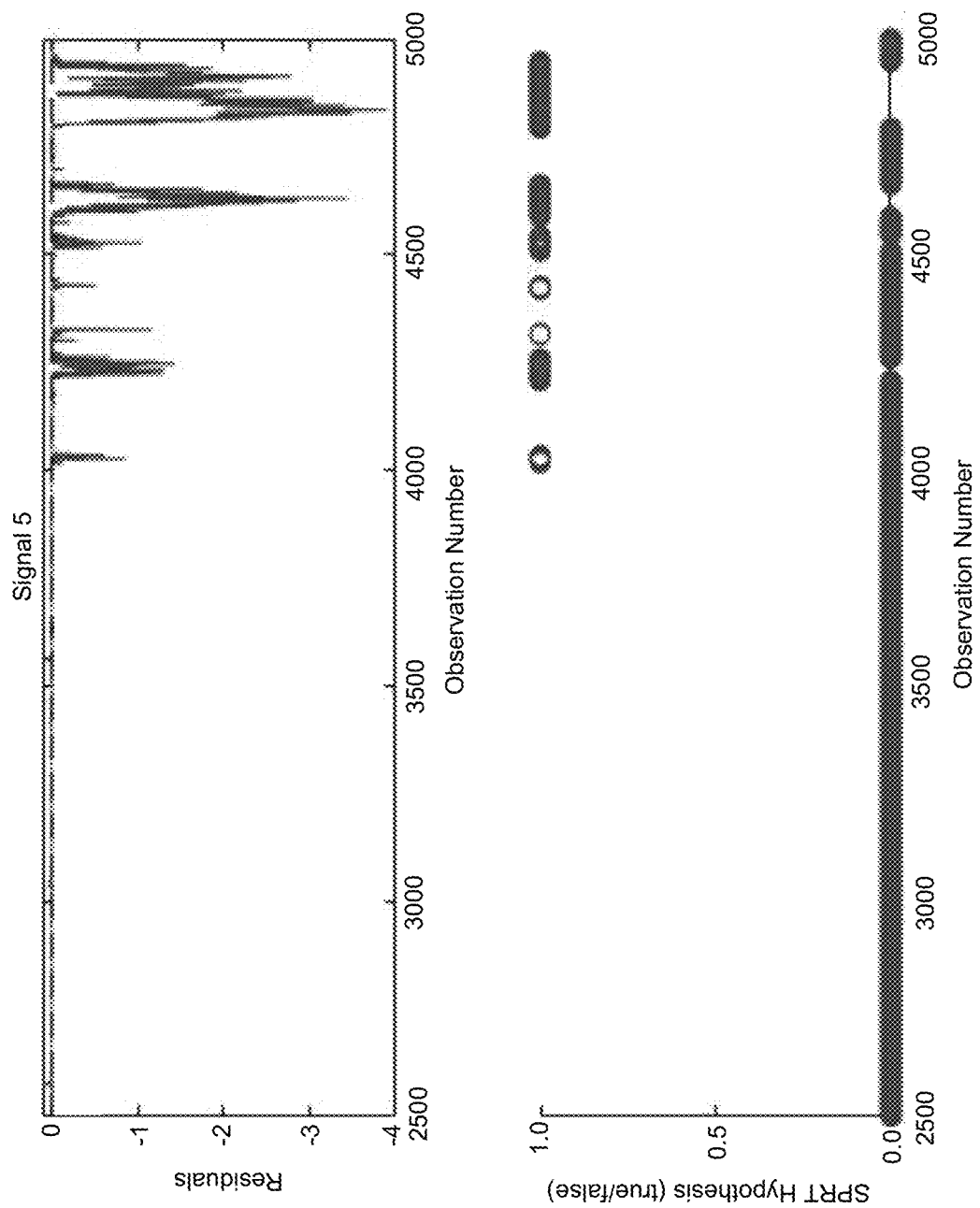
FIG. 2 presents graphs illustrating false SPRT alarms caused by signal 5 degrading in accordance with the disclosed embodiments.

A model comprising ten correlated time-series signals was generated to detect, characterize and analyze spillover, wherein each signal includes 5,000 time-series observations without any degradation. A step degradation was then added starting at observation number 3,750 to signal number 5. The signals were then fitted to an MSET model and the residuals were passed through SPRT to detect degradations and generate associated alarms. The top graph in FIG. 2 illustrates residual errors that result from degradation, which was added to signal 5. The lower graph in FIG. 2 illustrates corresponding SPRT alarms generated after the signal degrades starting at observation number 3,750.

Figure 3:
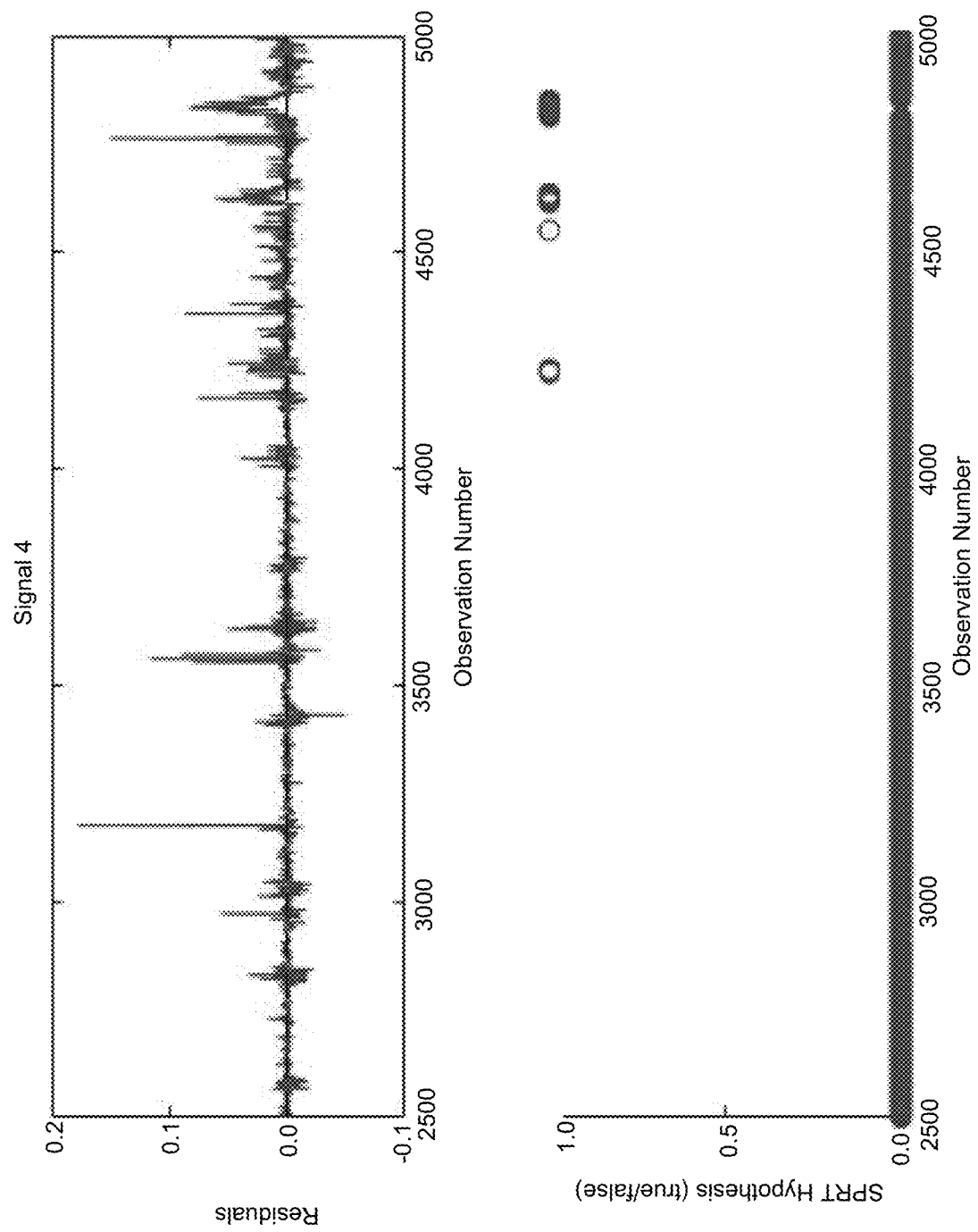
FIG. 3 presents graphs illustrating false SPRT alarms for signal 4 caused by signal 5 degrading in accordance with the disclosed embodiments.
Figure 4:
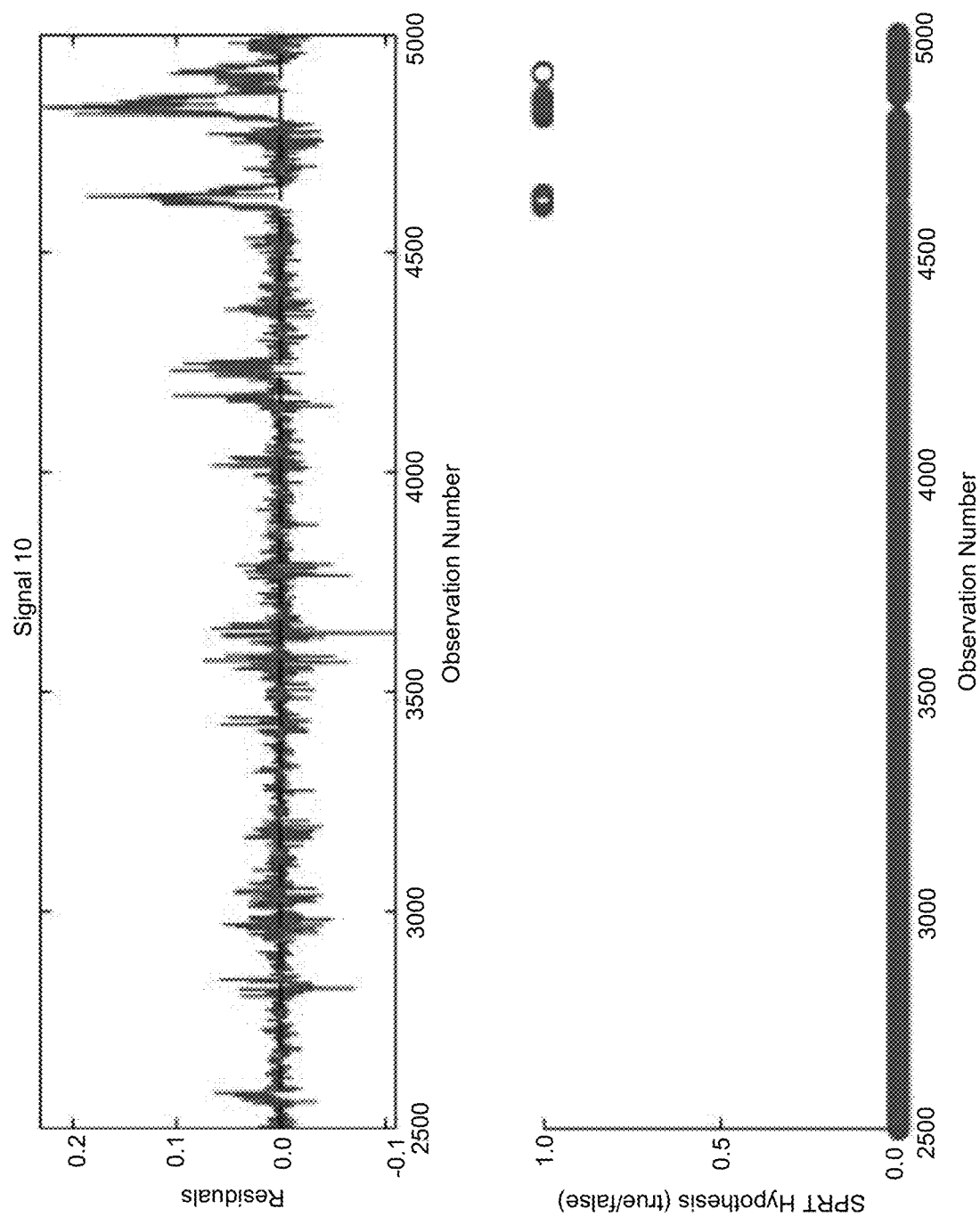
FIG. 4 presents graphs illustrating false SPRT alarms for signal 10 caused by signal 5 degrading in accordance with the disclosed embodiments.

The degradation in signal 5 can cause false alarms to be generated in other time-series signals due to unexpected dependencies between the inputs and outputs from the inferential model. For example, FIGS. 3 and 4 illustrate false alarms, which were raised for signals 4 and 10, respectively, even though only signal 5 was degraded.

Figure 5:
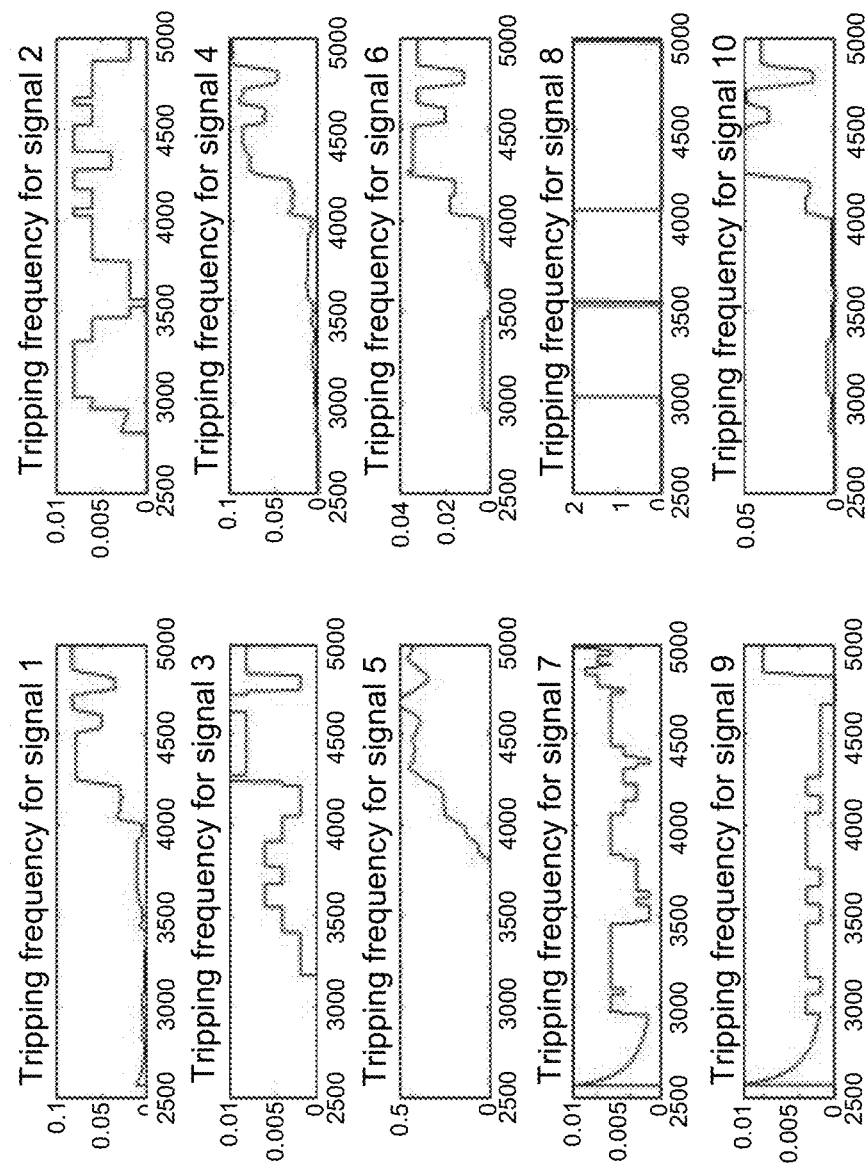
FIG. 5 presents graphs illustrating SPRT alarm tripping frequencies for signals 1-10 caused by signal 5 degrading in accordance with the disclosed embodiments.

The SPRT alarm tripping frequency (TF), which is defined as the number of alarms per observation, can be used to quantitatively analyze the effects of spillover. In particular, a windowed tripping frequency for a 500 observation window was computed, wherein the TF equals the number of alarms in the observation window divided by the window width. The resulting windowed tripping frequencies for the 10 signals appear in the graph shown in FIG. 5. Note that many signals show an increase in TF after signal 5 starts degrading at observation 3,750, which indicates spillover.

The spillover on each signal can be quantified as a "tripping frequency ratio" (TFR), which is computed as follows: TFR=TF (after degradation)/TF(before degradation). More specifically, the table in FIG. 6 illustrates: (1) the TF before degradation, (2) the TF after degradation and (3) the resulting TFR for all 10 signals. The spillover phenomenon can be observed by noticing that the tripping frequency went up by as high as 20 times for signal 10 in the non-degraded signals after degradation was introduced in signal 5. The mean SPRT TFR of all non-degraded signals can be used as a metric to analyze the degree of the overall spillover phenomenon of the model. (For the example illustrated in FIG. 6, the mean spillover for the trained model is 7.06.)

To better understand spillover and the effects of various parameters on it, spillover was studied by performing a parametric sweep across the following factors for a given system: (1) the signal noise standard deviation metric (STD); (2) the amplitude of the step degradation Deg; (3) the start time of the step degradation; (4) the number of training vectors numVec used to generate the MSET model; (5) the number of signals N used to generate the model; and (6) the training fraction, which is the fraction of vectors that were used for training purposes. During this study, the signal noise STD, the number of training vectors numVec, the number of signals N, and degradation amplitude Deg were discovered to have a consistent relationship with the degree of spillover.

Figure 7:
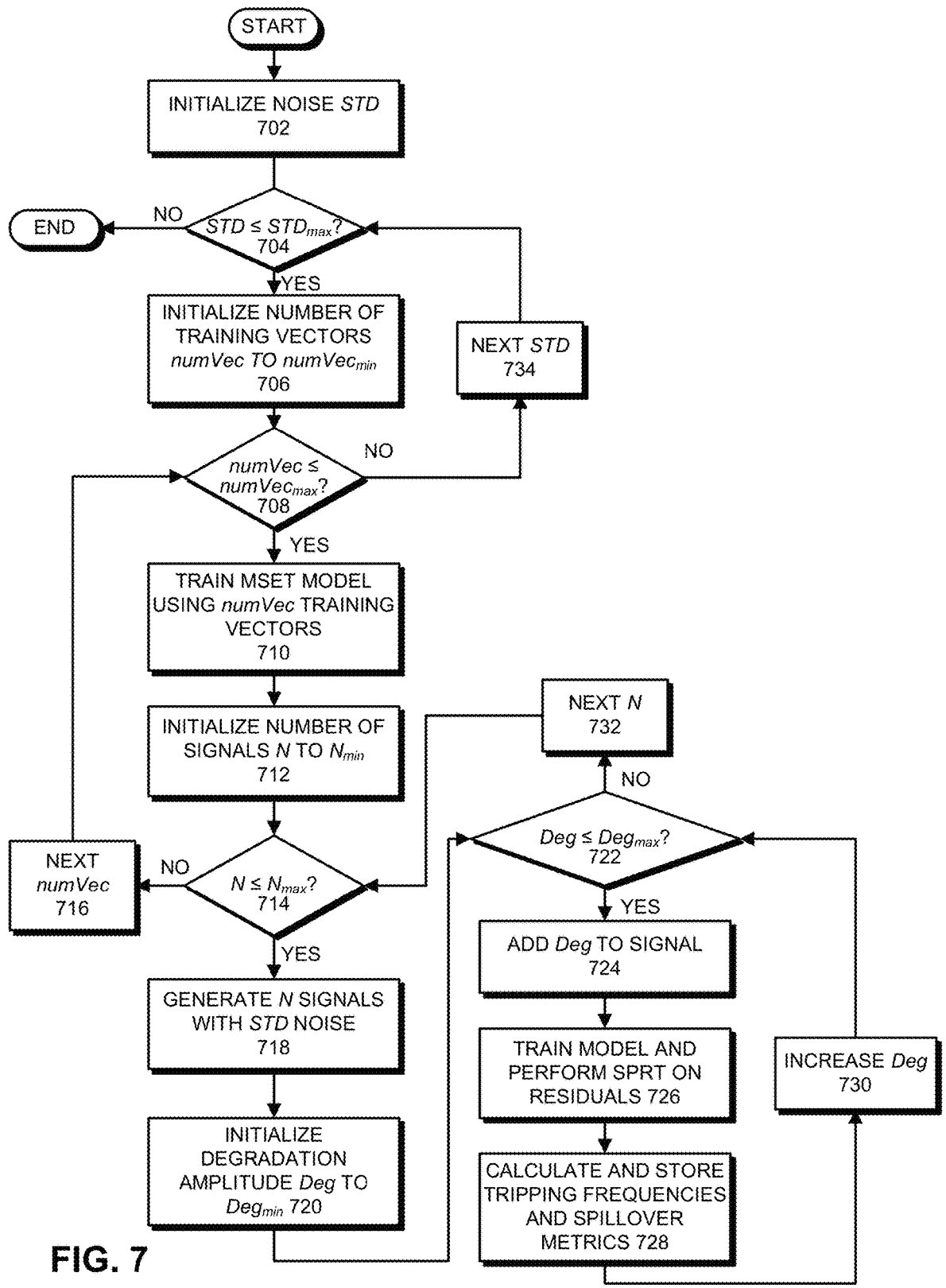
FIG. 7 presents a flow chart illustrating a process for characterizing spillover for different combinations of: number of signals, signal noise, degradation amplitude and number of training vectors in accordance with the disclosed embodiments.

FIG. 7 presents a flow chart illustrating a process for capturing and quantifying these relationships. During this process, after initializing all variables that are fixed, the system initializes the value for signal noise STD to a minimum value $STD_{min}$ (step 702). Next, the system compares the signal noise value STD against a maximum signal noise value $STD_{max}$ (step 704). If the result of the comparison $STD \leq STD_{max}$ is not true (NO at step 704), the process is complete. Otherwise (YES at step 704), the system initializes the value for numVec to a minimum value $numVec_{min}$ (step 706). Next, the system compares the number of training vectors numVec against a maximum number of training vectors $numVec_{max}$ (step 708). The system then compares numVec against a maximum number of training vectors $numVec_{max}$ (step 708). If the result of the comparison $numVec \leq numVec_{max}$ is not true (NO at step 708), the system increases the noise (step 734) and the process returns to step 704. Otherwise (YES at step 708), the system trains the MSET model using numVec training vectors (step 710), and the value for the number of signals N is initialized to a minimum value $N_{min}$ (step 712). Next, the system compares the number of signals N against a maximum number of signals $N_{max}$ (step 714.) If the result of the comparison $N \leq N_{max}$ is not true (NO at step 714), the system increases the number of training vectors numVec (step 716), and the process returns to step 708. Otherwise (YES at step 716), the system generates N signals with STD noise (step 718), and the system initializes the value for degradation amplitude Deg to a minimum value $Deg_{min}$ (step 720). Next, the system compares the degradation amplitude Deg against a maximum degradation amplitude $Deg_{max}$ (step 722.) If the result of the comparison $Deg \leq Deg_{max}$ is not true (NO at step 722) the system increases the number of signals N (step 732) and the system returns to step 714. Otherwise (YES at step 722), the system adds the degradation Deg to one of the signals (step 724), trains the model and performs the SPRT on the residuals (step 726), and calculates and stores the resulting tripping frequencies and spillover metrics (step 728). Next, the degradation amplitude Deg is increased (step 730) and the system returns to step 722. (Although it is not illustrated in the flow chart, differing degradation amplitudes are applied one at a time to each of the time-series signals.)

In addition to varying STD, numVec and Deg, it is also possible to vary signal sampling rates, which is equivalent to varying the total number of observations. This can be accomplished by adding a outer loop to the flow chart, which starts with a maximum sampling rate possible, and then systematically cuts back on the sampling density by, for example throwing out 1 out of 10 observations, 2 out of 10 observations, . . . , 9 out of 10 observations.

As illustrated in the flow chart in FIG. 7, as the process iterates through each signal in the model, one at a time, and superimposes degradation on it, parametric spillover analysis is conducted on all N−1 other signals while varying all possible permutations of: signal noise STD, number of training vectors numVec, number of signals N, and degradation amplitude Deg.

The reason we systematically vary the amount of noise is that any real data will have some fixed degree of measurement noise. Hence, if spillover occurs, it is important to know the associated fixed degree of noise. However, if spillover is absent, we want to run cases with increased noise, to assure there is still no spillover, even if the sensors age in the future and suffer from a poorer signal-to-noise ratio. For example, when monitoring a safety-critical application with an average sensor noise of 1.5%, it is good to know there is no spillover at that noise level. However, we also want to know if the measurement uncertainty grows in the future to 2% or 3% or higher, whether this will create spillover. Also, if we find that spillover is present at the nominal noise level on the original measured signals, but the spillover phenomenon goes away with smaller noise levels, then we can perform a filtering operation on the time-series signals to reduce the noise levels to eliminate spillover.

We also systematically vary the size of the degradation because spillover may occur for a degradation beyond a certain level, but spillover may be absent for smaller degradation levels. We also vary the number of training vectors, which are used to train the MSET model. We do this because using a large number of training vectors is computationally costly, but also provides higher prognostic accuracy. By varying the number of training vectors, we can determine for a given customer use case if spillover can be eliminated by using a larger or smaller number of training vectors.

Also, if the system has more signals than are needed to detect degradation in the system (say it has 40 signals, but anomalous behavior of the machine can be detected adequately with only 19 signals), then instead of using all 40 signals, we can save significant compute cost by reducing the size of the model. However, smaller models are more susceptible to spillover. Hence, there is value in starting with the full number of available signals (40 in this case), and then throwing out the "weakest-correlated" signals, one at a time, and then evaluating spillover with progressively fewer signals to determine how small of a model starts exhibiting spillover.

Figure 8A:
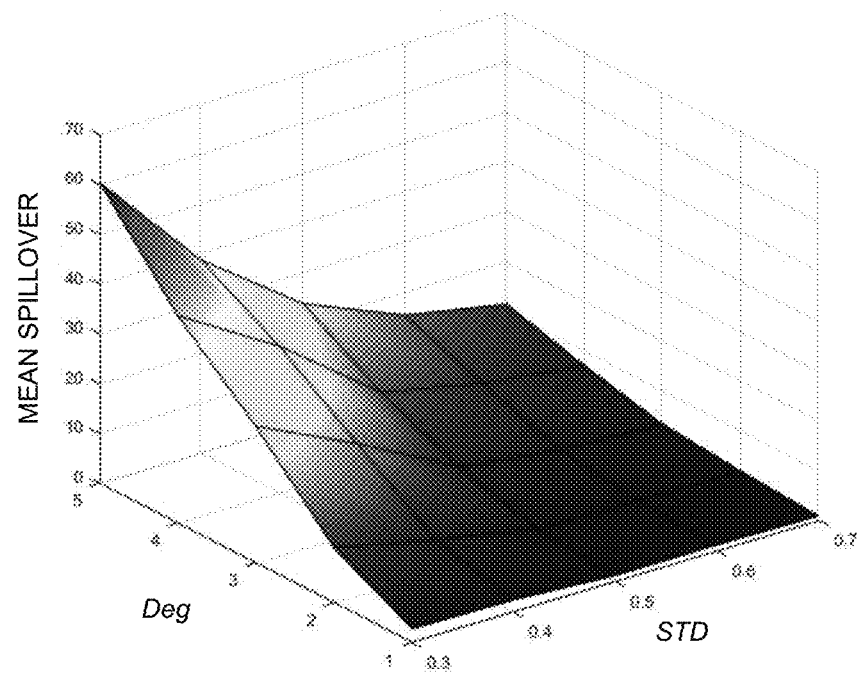
FIG. 8A presents a graph illustrating the effect of signal noise and degradation amplitude on mean spillover in accordance with the disclosed embodiments.
Figure 8B:
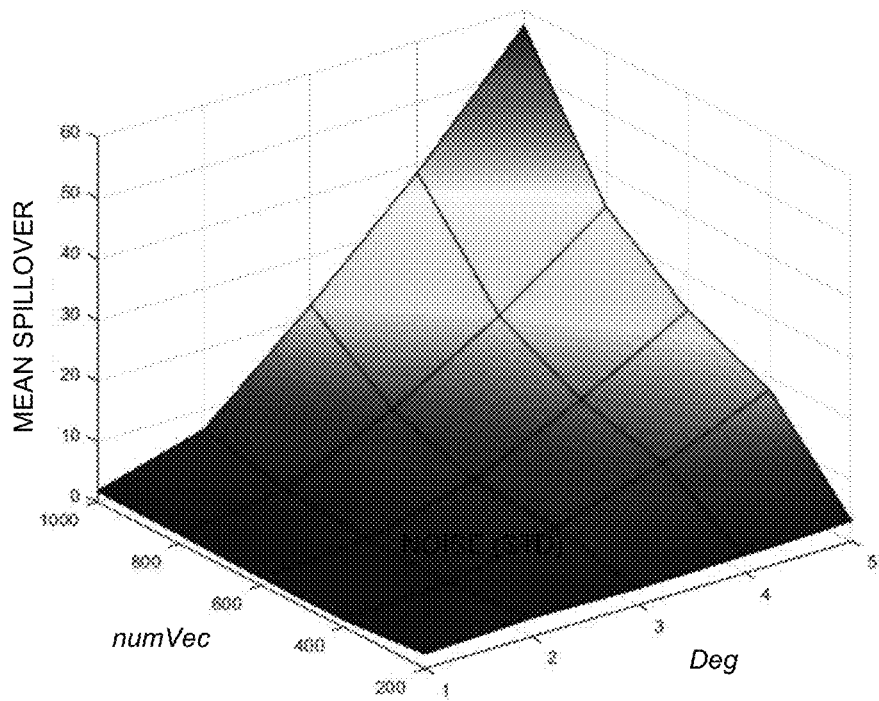
FIG. 8B presents a graph illustrating the effect of numbers of training vectors and degradation amplitude on mean spillover in accordance with the disclosed embodiments.

Exemplary results obtained from the above-described parametric process characterization process are illustrated in FIGS. 8A and 8B. FIG. 8A illustrates mean spillover as a function of degradation amplitude Deg and noise STD. In contrast, FIG. 8B illustrates mean spillover as a function of number of training vectors numVec and degradation amplitude Deg.

Figure 9:
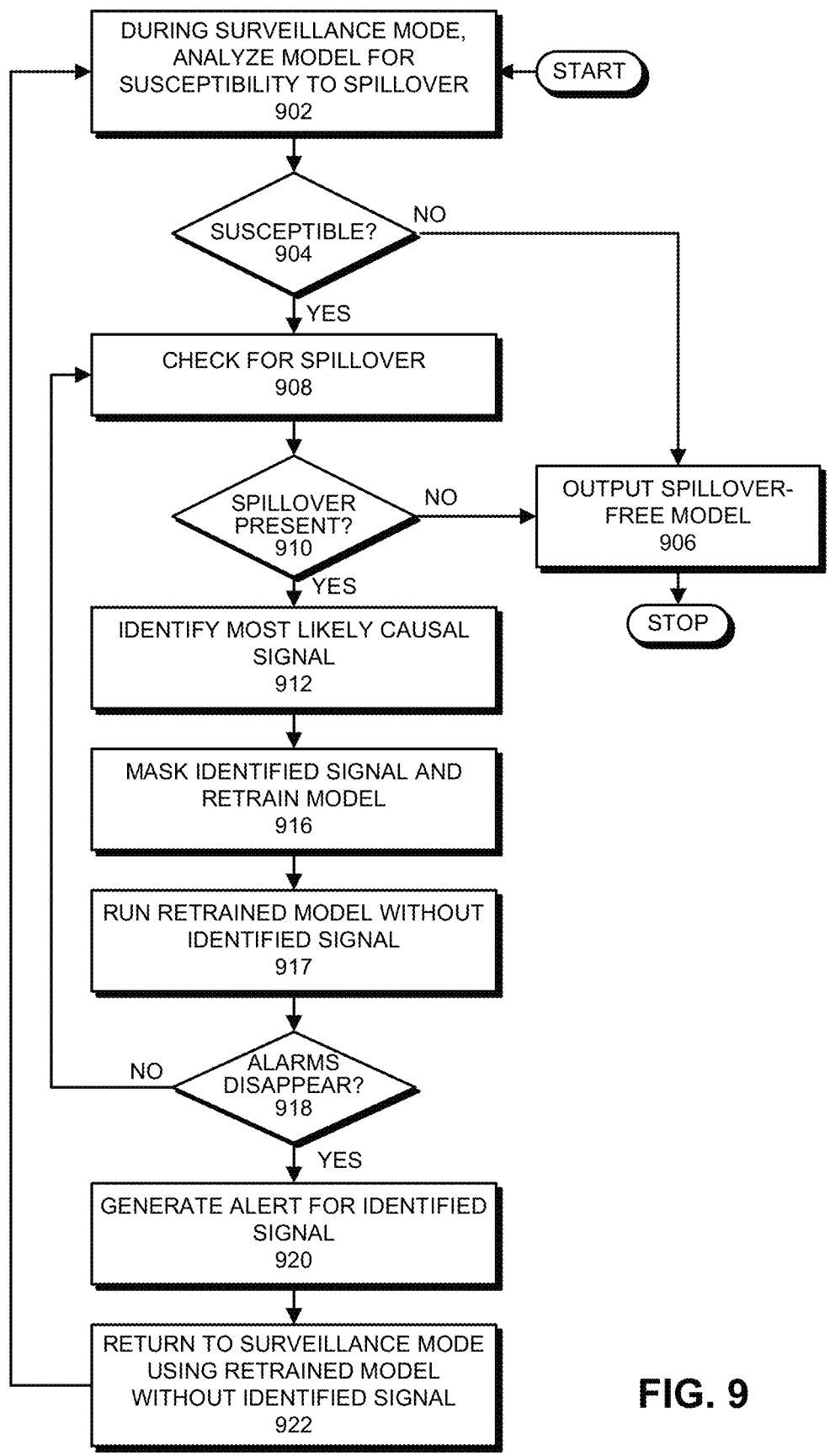
FIG. 9 presents a flow chart illustrating a process for detecting and mitigating spillover in accordance with the disclosed embodiments.

This comprehensive parametric analysis ensures that for any given set of monitored signals associated with a specific use case the model is absolutely robust (meaning there is no possibility of spillover), or if spillover is detected, an alert is sent to a data scientist indicating that the model is susceptible to spillover. At that point, a spillover mitigation technique, which is described below with reference to FIG. 9, is employed throughout the prognostic surveillance to protect the ML model from FIG. 9 presents a flow chart illustrating a process for detecting and mitigating spillover in accordance with the disclosed embodiments. First, the system analyzes the model for susceptibility to spillover (step 902), which involves using the process outlined in the flow chart in FIG. 8. Next, the system determines whether the model is susceptible to spillover (step 904). If the model is not susceptible to spillover (NO at step 904), or if no spillover is detected, the system outputs a spillover-free model (step 906), which can be used with confidence and without further spillover mitigation. On the other hand, if the model is found to be susceptible to spillover (YES at step 904), then the model is tested for spillover (step 908) by running the model using an exemplary set of time-series signals. Next, the system determines whether spillover is present (step 910). If not (NO at step 910), the system proceeds to step 906 and the process is complete. On the other hand, if spillover is present (YES at step 910), the system identifies the most likely causal signal (step 912), which is the signal with the highest SPRT tripping frequency. Next, the system masks the identified signal and retrains the model (step 916). The system then runs the retrained model without the identified signal (step 917) and determines whether the alarms disappear (step 918). If so (YES at step 918), the system generates an alert for the identified signal, which can involve sending a notification to a fault log, an operator console, a GUI screen, or to another use-case specific location (step 920). The system then returns to surveillance mode using the retrained model without the identified signal (step 922) and then returns to step 902. On the other hand, if the alarms do not disappear (NO at step 918), the system returns to step 908 to check for spillover again. Note that the above-described process completes after all spillover-causing signals are removed from the model.

Process for Detecting and Mitigating Spillover

Figure 10:
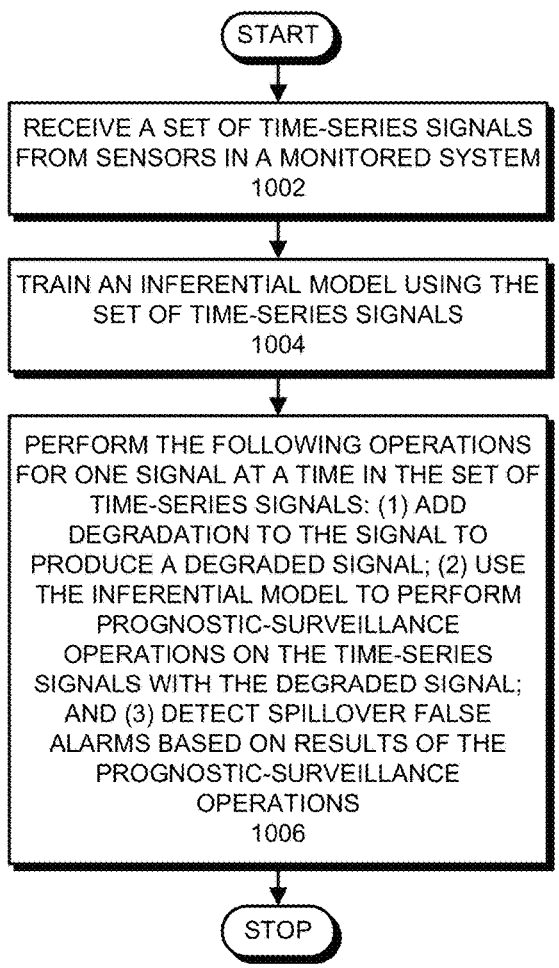
FIG. 10 presents a flow chart illustrating a process for determining whether an inferential model is susceptible to spillover false alarms in accordance with the disclosed embodiments.

FIG. 10 presents a flow chart illustrating a process for determining whether an inferential model is susceptible to spillover false alarms in accordance with the disclosed embodiments. During operation, the system receives a set of time-series signals from sensors in a monitored system (step 1002). The system then trains an inferential model using the set of time-series signals (step 1004). Next, the system tests the inferential model for susceptibility to spillover false alarms by performing the following operations for one signal at a time in the set of time-series signals. First, the system adds degradation to the signal to produce a degraded signal. Note that this can involve adding different degradation amplitudes to the signal to determine how different degradation amplitudes affect spillover false alarms. The system then uses the inferential model to perform prognostic-surveillance operations on the time-series signals with the degraded signal. Finally, the system detects spillover false alarms based on results of the prognostic-surveillance operations (step 1006). Note that the training and testing operations are repeated using different numbers of training vectors for the inferential model to determine how different numbers of training vectors affect spillover false alarms. The system also adds different amounts of noise to the set of time-series signals while repeating the training and testing operations to determine how different amounts of noise affect spillover false alarms. The system also uses different numbers of time-series signals from the set of time-series signals while repeating the training and testing operations to determine how using different numbers of time-series signals affects spillover false alarms.

Figure 11:
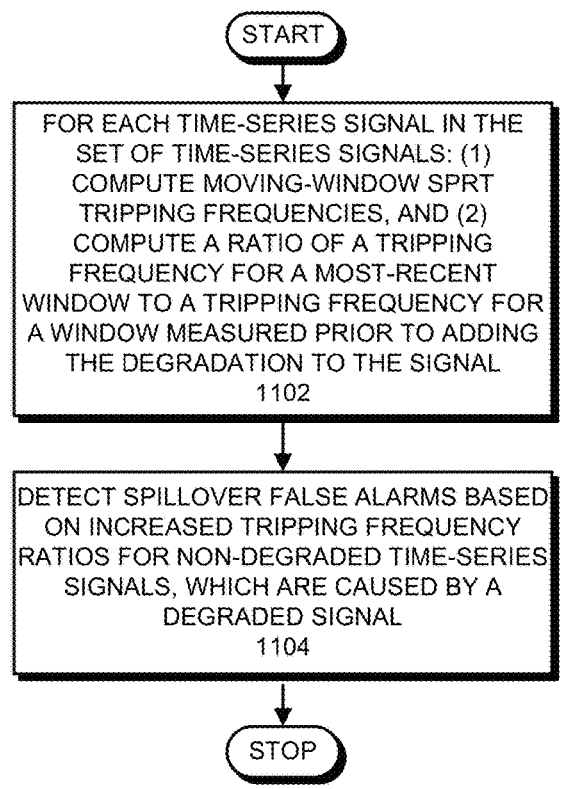
FIG. 11 presents a flow chart illustrating a process for detecting spillover false alarms in accordance with the disclosed embodiments.

FIG. 11 presents a flow chart illustrating a process for detecting the spillover false alarms in accordance with the disclosed embodiments. For each time-series signal in the set of time-series signals, the system computes moving-window SPRT tripping frequencies, and then computes a ratio of a tripping frequency for a most-recent window to a tripping frequency for a window measured prior to adding the degradation to the signal (step 1102). Next, the system detects spillover false alarms based on increased tripping frequency ratios for non-degraded time-series signals, which are caused by a degraded signal (step 1104).

Figure 12:
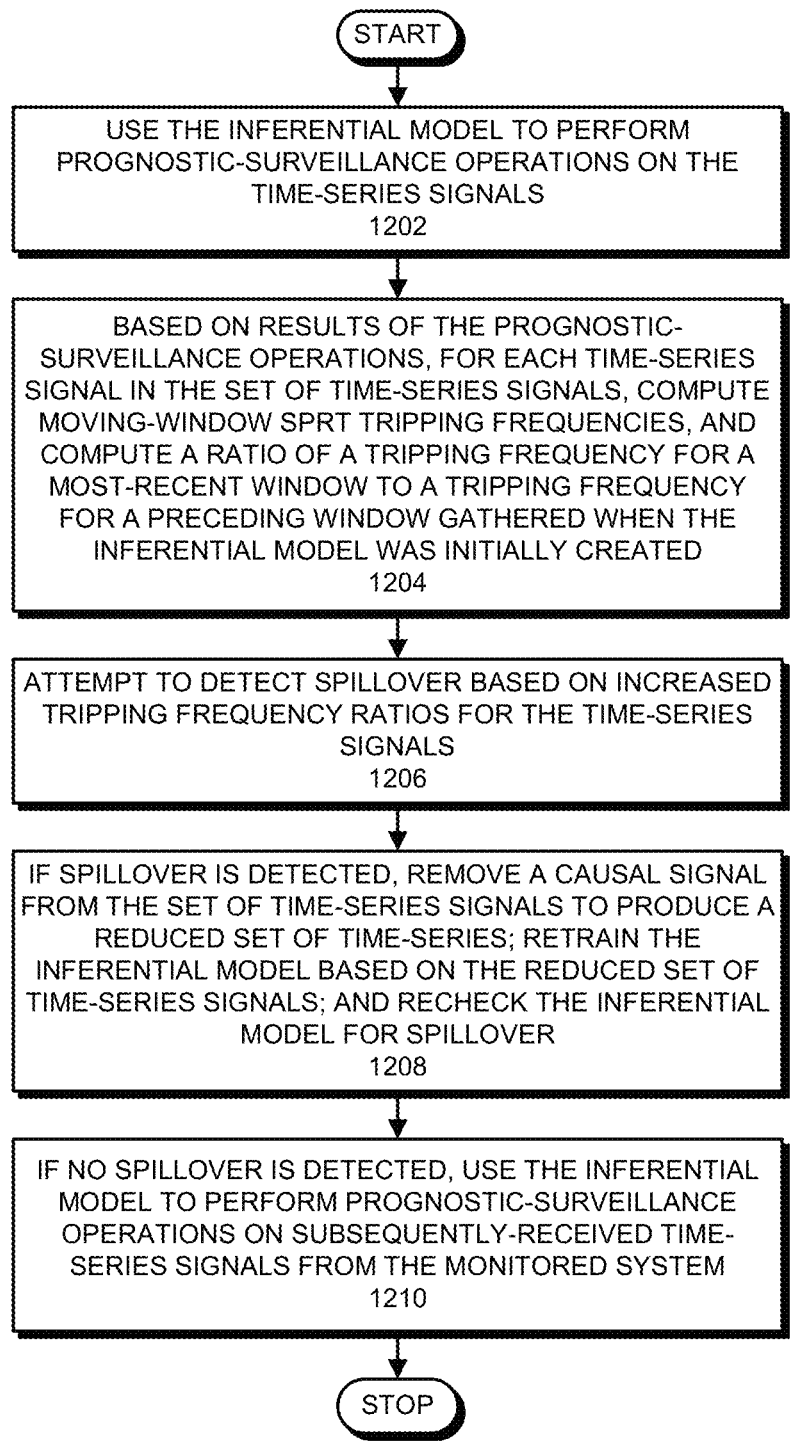
FIG. 12 presents a flow chart illustrating a process for mitigating spillover in accordance with the disclosed embodiments.

FIG. 12 presents a flow chart illustrating a process for mitigating spillover in accordance with the disclosed embodiments. When the testing indicates that the inferential model is susceptible to causing spillover false alarms, the system checks the inferential model for spillover. During this checking process, the system uses the inferential model to perform prognostic-surveillance operations on the time-series signals (step 1202). Then, based on results of the prognostic-surveillance operations, for each time-series signal in the set of time-series signals, the system computes moving-window SPRT tripping frequencies, and computes a ratio of a tripping frequency for a most-recent window to a tripping frequency for a preceding window gathered when the inferential model was initially created (step 1204). The system then attempts to detect spillover based on increased tripping frequency ratios for the time-series signals (step 1206). If spillover is detected, the system: removes a causal signal from the set of time-series signals to produce a reduced set of time-series signals; retrains the inferential model based on the reduced set of time-series signals; and rechecks the inferential model for spillover (step 1208). On the other hand, if no spillover is detected, the system uses the inferential model to perform prognostic-surveillance operations on subsequently received time-series signals from the monitored system (step 1210).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for determining whether an inferential model is susceptible to spillover false alarms, comprising:
receiving a set of time-series signals from sensors in a monitored system;
training the inferential model using the set of time-series signals; and
testing the inferential model for susceptibility to spillover false alarms by performing the following operations for one signal at a time in the set of time-series signals,
adding degradation to the signal to produce a degraded signal,
using the inferential model to perform prognostic-surveillance operations on the time-series signals with the degraded signal, and
detecting spillover false alarms based on results of the prognostic-surveillance operations.

2. The method of claim 1, wherein detecting the spillover false alarms involves:
for each time-series signal in the set of time-series signals,
computing moving-window sequential probability ratio test (SPRT) tripping frequencies, and
computing a ratio of a tripping frequency for a most-recent window to a tripping frequency for a window measured prior to adding the degradation to the signal; and
detecting spillover false alarms based on increased tripping frequency ratios for non-degraded time-series signals, which are caused by a degraded signal.

3. The method of claim 1, wherein adding the degradation to the signal involves adding different degradation amplitudes to the signal to determine how different degradation amplitudes affect spillover false alarms.

4. The method of claim 1, wherein the training and testing operations are repeated using different numbers of training vectors for the inferential model to determine how different numbers of training vectors affect spillover false alarms.

5. The method of claim 1, wherein the method further comprises adding different amounts of noise to the set of time-series signals while repeating the training and testing operations to determine how different amounts of noise affect spillover false alarms.

6. The method of claim 1, wherein the method further comprises using different numbers of time-series signals from the set of time-series signals while repeating the training and testing operations to determine how using different numbers of time-series signals affects spillover false alarms.

7. The method of claim 6, wherein using a different number of time-series signals involves throwing out a subset of signals with weak cross-signal correlations from the set of time-series signals.

8. The method of claim 1, wherein when the testing indicates that the inferential model is susceptible to causing spillover false alarms, the method further comprises:
checking the inferential model for spillover by,
using the inferential model to perform prognostic-surveillance operations on the time-series signals,
based on results of the prognostic-surveillance operations, for each time-series signal in the set of time-series signals,
computing moving-window SPRT tripping frequencies, and
computing a ratio of a tripping frequency for a most-recent window to a tripping frequency for a preceding window gathered when the inferential model was initially created, and
attempting to detect spillover based on increased tripping frequency ratios for the time-series signals;
when spillover is detected,
removing a causal signal from the set of time-series signals to produce a reduced set of time-series signals,
retraining the inferential model based on the reduced set of time-series signals, and
rechecking the inferential model for spillover; and when no spillover is detected, using the inferential model to perform prognostic-surveillance operations on subsequently received time-series signals from the monitored system.

9. The method of claim 8, wherein removing the causal signal from the set of time-series signals involves updating a fault log or generating a notification about the causal signal.

10. The method of claim 8, wherein using the inferential model to perform prognostic-surveillance operations on the subsequently received time-series signals comprises:
   using the prognostic inferential model to generate estimated values for the subsequently received time-series sensor data;
   performing a pairwise differencing operation between actual values and the estimated values for the subsequently received time-series sensor data to produce residuals; and
   performing a sequential probability ratio test (SPRT) on the residuals to detect the incipient anomalies.

11. The method of claim 10, wherein detecting the incipient anomalies comprises detecting one or more of the following:
   an impending failure of the monitored system; and
   a malicious-intrusion event in the monitored system.

12. A non-transitory computer-readable storage medium storing instructions that when executed by a computer cause the computer to perform a method for determining whether an inferential model is susceptible to spillover false alarms, wherein the method comprises:
   receiving a set of time-series signals from sensors in a monitored system;
   training the inferential model using the set of time-series signals; and
   testing the inferential model for susceptibility to spillover false alarms by performing the following operations for one signal at a time in the set of time-series signals,
      adding degradation to the signal to produce a degraded signal, and
      using the inferential model to perform prognostic-surveillance operations on the time-series signals with the degraded signal, and
   detecting spillover false alarms based on results of the prognostic-surveillance operations.

13. The non-transitory computer-readable storage medium of claim 12, wherein detecting the spillover false alarms involves:
   for each time-series signal in the set of time-series signals,
      computing moving-window sequential probability ratio test (SPRT) tripping frequencies, and
      computing a ratio of a tripping frequency for a most-recent window to a tripping frequency for a window measured prior to adding the degradation to the signal; and
   detecting spillover false alarms based on increased tripping frequency ratios for non-degraded time-series signals, which are caused by a degraded signal.

14. The non-transitory computer-readable storage medium of claim 12,
   wherein adding the degradation to the signal involves adding different degradation amplitudes to the signal to determine how different degradation amplitudes affect spillover false alarms;
   wherein the training and testing operations are repeated using different numbers of training vectors for the inferential model to determine how different numbers of training vectors affect spillover false alarms;
   wherein the method further comprises adding different amounts of noise to the set of time-series signals while repeating the training and testing operations to determine how different amounts of noise affect spillover false alarms; and
   wherein the method further comprises using different numbers of time-series signals from the set of time-series signals while repeating the training and testing operations to determine how using different numbers of time-series signals affects spillover false alarms.

15. The non-transitory computer-readable storage medium of claim 12, wherein when the testing indicates that the inferential model is susceptible to causing spillover false alarms, the method further comprises:
   checking the inferential model for spillover by,
      using the inferential model to perform prognostic-surveillance operations on the time-series signals,
      based on results of the prognostic-surveillance operations, for each time-series signal in the set of time-series signals,
         computing moving-window SPRT tripping frequencies, and
         computing a ratio of a tripping frequency for a most-recent window to a tripping frequency for a preceding window gathered when the inferential model was initially created; and
      attempting to detect spillover based on increased tripping frequency ratios for the time-series signals;
   when spillover is detected,
      removing a causal signal from the set of time-series signals to produce a reduced set of time-series signals,
      retraining the inferential model based on the reduced set of time-series signals, and
      rechecking the inferential model for spillover; and
   when no spillover is detected, using the inferential model to perform prognostic-surveillance operations on subsequently received time-series signals from the monitored system.

16. The non-transitory computer-readable storage medium of claim 15, wherein removing the causal signal from the set of time-series signals involves updating a fault log or generating a notification about the causal signal.

17. A system that determines whether an inferential model is susceptible to spillover false alarms, comprising:
   at least one processor and at least one associated memory; and
   a prognostic-surveillance mechanism that executes on the at least one processor, wherein during operation, the prognostic-surveillance mechanism:
   receives a set of time-series signals from sensors in a monitored system;
   trains the inferential model using the set of time-series signals; and
   tests the inferential model for susceptibility to spillover false alarms, wherein during the testing, the prognostic-surveillance mechanism performs the following operations for one signal at a time in the set of time-series signals,
      adds degradation to the signal to produce a degraded signal,
      uses the inferential model to perform prognostic-surveillance operations on the time-series signals with the degraded signal, and
      detects spillover false alarms based on results of the prognostic-surveillance operations.

18. The system of claim 17, wherein while detecting the spillover false alarms, the prognostic-surveillance mechanism does the following:
for each time-series signal in the set of time-series signals,
computes moving-window sequential probability ratio test (SPRT) tripping frequencies, and
computes a ratio of a tripping frequency for a most-recent window to a tripping frequency for a window measured prior to adding the degradation to the signal; and
detects spillover false alarms based on increased tripping frequency ratios for non-degraded time-series signals, which are caused by a degraded signal.

19. The system of claim 17,
wherein adding the degradation to the signal involves adding different degradation amplitudes to the signal to determine how different degradation amplitudes affect spillover false alarms;
wherein the training and testing operations are repeated using different numbers of training vectors for the inferential model to determine how different numbers of training vectors affect spillover false alarms;
wherein the method further comprises adding different amounts of noise to the set of time-series signals while repeating the training and testing operations to determine how different amounts of noise affect spillover false alarms; and
wherein the method further comprises using different numbers of time-series signals from the set of time-series signals while repeating the training and testing operations to determine how using different numbers of time-series signals affects spillover false alarms.

20. The system of claim 17, wherein when the testing indicates that the inferential model is susceptible to causing spillover false alarms, the prognostic-surveillance mechanism checks the inferential model for spillover, and while checking the inferential model for spillover, the prognostic-surveillance mechanism:
uses the inferential model to perform prognostic-surveillance operations on the time-series signals, and
based on results of the prognostic-surveillance operations,
for each time-series signal in the set of time-series signals,
computes moving-window SPRT tripping frequencies, and
computes a ratio of a tripping frequency for a most-recent window to a tripping frequency for a preceding window gathered when the inferential model was initially created; and
attempts to detect spillover based on increased tripping frequency ratios for the time-series signals;
when spillover is detected,
removes a causal signal from the set of time-series signals to produce a reduced set of time-series signals,
retrains the inferential model based on the reduced set of time-series signals, and
rechecks the inferential model for spillover; and
when no spillover is detected, uses the inferential model to perform prognostic-surveillance operations on subsequently received time-series signals from the monitored system.

* * * * *